United States Patent Office 3,511,825
Patented May 12, 1970

3,511,825
OXYALKYLATED WOOD TARS
Marco Wismer, Gibsonia, Herman P. Doerge, Verona, and Paul R. Mosso, Natrona Heights, Pa., assignors to PPG Industries, Inc., a corporation of Pennsylvania
No Drawing. Original application May 29, 1967, Ser. No. 642,221, now Patent No. 3,468,822. Divided and this application Jan. 2, 1969, Ser. No. 798,566
Int. Cl. C08h 13/00; C08g 22/08
U.S. Cl. 260—97                7 Claims

ABSTRACT OF THE DISCLOSURE

This invention relates to novel polyurethane resins and novel hydroxyl-containing resins prepared from wood tars. In particular, this invention pertains to the preparation of polyurethane foams from a wood tar having a hydroxyl number of about 40 to about 300 and from the oxyalkylation products of said wood tars. More particularly, this invention relates to the preparation of novel rigid polyurethane foams having excellent water vapor transmission resistance.

CROSS-REFERENCES TO RELATED APPLICATIONS

This application is a division of U.S. application Ser. No. 642,221, filed May 29, 1967 (now allowed), which in turn is a continuation-in-part of U.S. application Ser. No. 385,780, filed July 28, 1964 (now abandoned).

STATE OF THE PRIOR ART

Wood tars, including both the hardwood tars obtained from carbonization, i.e., thermal decomposition in the substantial absence of oxygen, of hard woods such as birch, beech, hickory, oak, ash, locust, hackberry, maple and the like, and the pine tars obtained from the carbonization of resinous woods such as the various species of pines, have had limited industrial application and are used primarily as a source of fuel in the carbonization process. Some industrial applications include use as extenders for synthetic resins, as softeners for rubber, as a preservative in waterproofing agents for fibers, and as special lubricants. These applications utilize primarily the physical characteristics of the wood tars. Utilization of the wood tars as a reaction component has been limited.

The exact composition of wood tars is unknown and varies somewhat depending upon the source, although it is known that they contain numerous organic compounds such as crotonaldehyde, butyrolactone, pyrocatechol, and the like. Furthermore, it is known that the wood tars generally have a hydroxyl number in the range of about 40 to about 300.

DESCRIPTION OF THE INVENTION

It has now been discovered that wood tars can be utilized successfully in the preparation of urethane resins, particularly urethane foams. Novel urethane resins can be prepared by reacting an organic polyisocyanate with (1) wood tars per se, (2) the oxyalkylation product of a wood tar and an alkylene oxide having 2 to 4 carbon atoms, (3) a blend of said oxyalkylation product of a wood tar and a reactive hydrogen-containing material of the type conventionally utilized in polyurethane resin preparation, or (4) a blend of a wood tar per se and a reactive hydrogen-containing material of the type conventionally utilized in polyurethane resin preparation.

While it is surprising that organic polyisocyanates and alkylene oxides react with wood tars to form novel polyurethane resins and novel oxyalkylation products, respectively, it is especially significant that rigid polyurethane foams formed from a wood tar having a hydroxy number of about 120 to about 300, preferably about 160 to about 300, or an oxyalkylation product thereof, have exceptional water vapor transmission resistance.

The general reaction of compounds having isocyanato groups and compounds having a group containing an active hydrogen, such as an —OH or —NH$_2$ group, is known, as is the reaction of organic polyisocyanates and various types of polyhydroxy compounds, conventionally termed polyols, in the presence of a suitable blowing agent to form polyurethane foams. A detailed description of the reaction of organic polyisocyanates with various polyols is contained in Polyurethanes: Chemistry and Technology, by Saunders and Frisch, Interscience Publishers (1962), especially pages 219–235.

Rigid polyurethane foams produced by the reaction of an organic polyisocyanate and a polyether polyol such as the oxyalkylation product of sucrose, sorbitol, methyl glycoside, pentaerythritol and the like, are extremely useful for such purposes as heat insulation, sound insulation, packaging applications, buoyant articles such as boats, surfboards and the like, and for many other purposes.

One particular use for polyurethane foams has been as insulation for refrigerators, freezers, refrigerated trucks, refrigerated railroad cars, and similar cold storage containers. In such applications, foams must possess excellent resistance to water vapor transmission and excellent dimensional stability at low temperatures as well as excellent resistance to heat transmission. Generally, foams prepared from an organic polyisocyanate and a conventional polyether polyol have the requisite properties for use as low-temperature insulation when the polyether polyol possesses a hydroxyl number of at least about 400 and preferably above about 450.

Although polyurethane foams prepared from a conventional polyether polyol having a hydroxyl number of at least about 400 have suitable low-temperature insulation properties, such foams require the utilization of large quantities of organic polyisocyanate as conventionally one equivalent of isocyanate is utilized for each equivalent of polyol. Therefore, it is desirable to use polyols of low hydroxyl number to minimize the amount of expensive polyisocyanate necessary to produce a suitable polyurethane foam.

In view of the importance of water vapor transmission resistance as a characteristic of rigid polyurethane foams used for low-temperature insulation purposes and the fact that polyurethane foams prepared from conventional polyether polyols of sucrose, sorbitol, methyl glucoside, trimethylol propane and the like, have water vapor transmission values of 4.0 perms/inch, it is surprising that polyurethane foams prepared from wood tars having a hydroxy number of about 120 to about 300, and preferably from about 160 to about 300, have water vapor transmission values as low as about 1.1 perms/inch.

As indicated above, novel polyurethane resins may be prepared in various ways from wood tars. One method comprises reacting an organic polyisocyanate with a wood tar having a hydroxy number of 40 to about 300 in the presence of a suitable catalyst. To prepare a foam, the reaction is conducted in the presence of a cellulating agent. If a rigid polyurethane foam is desired, it is preferred that the wood tar have a hydroxy number of about 160 to about 300.

Another method of preparing novel polyurethane resins comprises reacting an oxyalkylation product of a wood tar with an organic polyisocyanate. These novel oxyalkylation products are prepared by reacting a lower alkylene oxide, preferably having 2 to 4 carbon atoms, with a wood tar having a hydroxyl number of about 40 to about 300. The oxyalkylated products may be prepared by the conventional procedures known in the art for preparing oxyalkylated polyether polyols, for example, the process disclosed by Wurtz in 1895 and in Encyclopedia of Chemical Technology, Interscience Publishers (1951), vol. 7, pages 257–62, as well as exemplified by the procedures in U.S. Pats. Nos. 1,922,459, 1,970,578, 2,213,477, 2,575,-832, 2,593,112, 2,676,957, and others. For example, the reaction is conducted in the absence of water, preferably under super atmospheric pressure, generally up to 100 p.s.i., at a temperature between about 50° C. and 170° C., more preferably between about 100° C. and 150° C., in the presence of a basic catalyst, e.g., alkali metal catalysts such as sodium hydroxide and potassium t-butoxide, by adding alkylene oxide to the starting material which is preferably stirred and in a molten or fluid state, or dissolved.

If a flexible polyurethane foam is desired, it is preferred that the wood tar have a hydroxyl number of at least about 70 prior to oxyalkylation. If a rigid polyurethane foam is desired, it is preferred that the wood tar have a hydroxyl number of at least about 160 prior to oxyalkylation and that the oxyalkylation product thereof has a hydroxyl number of at least about 150. Foam preparation requires, of course, that the reaction be conducted in the presence of a cellulating agent.

A third method of preparing novel polyurethane resins comprises reacting an organic polyisocyanate with a blend of (1) a wood tar or an oxyalkylation product thereof, and (2) another reactive hydrogen-containing material such as, for example, any of the conventional polyether polyols utilized in the preparation of polyurethane foams, preferably those materials having a hydroxyl number of about 250 to about 800. Examples of such materials are listed below.

It has been found that the wood tar or an oxyalkylation product thereof is compatible with other reactive hydrogen-containing materials and with the cellulating agents utilized in foam preparation. The wood tar per se generally comprises about 5 percent by weight to about 90 percent by weight of the blend although it is preferred that it comprise about 5 percent by weight to about 70 percent by weight. When rigid foams are to be prepared, it is preferred that the wood tar per se have a hydroxyl number of about 160 to about 300.

When wood tar oxyalkylation products are to be utilized in polyurethane foam preparation, it is preferred that said oxyalkylation products have a hydroxyl number of at least about 40 for flexible foam production, and at least about 150 for rigid foam production.

A further desirable property of the novel wood tar oxyalkylation products described in this invention resides in their excellent compatibility with the halocarbons widely utilized as blowing agents in polyurethane foams. This excellent compatibility enables the preparation of rigid polyurethane foams having densities of about 1.5 pounds per cubic foot.

If it is desired to use carbon dioxide as a cellulating agent, then the quantity of organic polyisocyanate present must be adjusted as some of the —NCO groups are consumed by reaction with water.

Examples of polyether polyols which may be blended or co-oxyalkylated with the wood tars described hereinabove include polyether polyols of sucrose, sorbitol, mannitol, alpha-methyl glucoside, trimethylol propane, the novolak resins, e.g., phenol-formaldehyde condensation products, and the like, and aminic compounds such as diethanolamine, triethanolamine, diethylene triamine, and the like, and oxyalkylation products thereof.

The wood tars particularly useful in this invention are hardwood tars and pine tars. These tars are ordinarily obtained from the pyrolization of hardwood and pine wood at temperatures of about 500° F. to about 800° F. Pyrolization conducted in the substantial absence of oxygen reduces the wood to charcoal and vaporizes the organic compounds and organic resins contained in the wood. The vaporized materials are recovered and condensed. The wood tars are that portion of the condensate which has had the more volatile materials removed. The wood tars useful in this invention are resinous liquids or solids containing substantially no volatile materials having a boiling point of less than about 80° C.

Wood tar oxyalkylation products having a hydroxyl value of about 50 to about 300 are useful as detergents and wetting agents, while such products having a hydroxyl number of about 50 to about 100 are particularly useful in flexible urethane foams and wood tars and oxyalkylation products thereof having a hydroxyl number of about 160 to about 300, and about 150 to about 290, respectively, are particularly useful in rigid urethane foams.

Rigid polyurethane foams containing hardwood tars or hardwood tar oxyalkylation products are useful as packaging materials, as insulating materials, as filler in buoyant articles and the like. The high resistance of such foams to water vapor renders them especially suitable for low-temperature insulating applications.

Suitable organic polyisocyanates which may be reacted by urethane reaction with the wood tars, wood tar blends and co-oxyalkylation products herein disclosed to form stable, cured foams are listed as follows:

Toluene diisocyanate
Diphenyl diisocyanate
Triphenyl diisocyanate
Chlorophenyl-2,4-diisocyanate
Ethylene diisocyanate
1,4-tetramethylene diisocyanate
P-phenylene diisocyanate
Hexamethylene diisocyanate
3,3'-dimethyl-4,4'-biphenylene diisocyanate
3,3'-dimethoxy-4,4'-biphenylene diisocyanate
Polymethylene polyphenyl isocyanate
Diphenylmethane-4,4'-diisocyanate and the like. Mixtures of two or more of these polyisocyanates are contemplated.

Prepolymers of quasi-prepolymers of polyols and organic polyisocyanates which contain a plurality of available isocyanate groups per molecule may also be regarded as being organic polyisocyanates within the broad terminology herein employed. One organic polyisocyanate which can readily be obtained commercially consists of a mixture of 80 percent of 2,4-tolylene diisocyanate and 20 percent of 2,6-tolylene diisocyanate. Another commercial material which may be used is a 65 percent/35 percent mixture of the same isomers of tolylene diisocyanate. An additional material which may be used is an impure mixture of tolylene diisocyanates often used commercially in forming polyurethane resins.

The relative amount of organic polyisocyanate utilized is susceptible of variation over a substantial range. Usually, they will be employed in an amount at least approximately equivalent to the total hydroxyl groups in the total polyol component. Some of the organic polyisocyanates tend to evaporate, therefore, it may be desirable to compensate for this loss. A range of about one-half equivalent to about 2 equivalents of organic isocyanate per equivalent of polyol component in the final material is ordinarily used, but is not critical.

In order to obtain polyurethane resins embodying as a polyol component co-oxyalkylated or blended polyols as herein disclosed, prepolymers of quasi-prepolymers may first be prepared by reacting an excess of organic diisocyanate with a part of said polyol component. All or most of the total organic polyisocyanate component may thus be reacted with about 10 percent to about 20 percent of the total of the polyol component of the final polyurethane resin whereby to give prepolymer molecules, each of which contains two or more available isocyanate final curing of the polyurethane resins, catalysts are groups.

To promote the polyurethane linkage reactions in the usually required. Many of these comprise tertiary amines or hydroxy amines, organic salts of tin, and the like. The following constitutes a partial list of catalyst from which selection may be made:

Tetramethylethylenediamine (anhydrous) (TMEDA)
Tetramethyl guanidine (TMG)
Tetramethyl-1,3-butanediamine (TMBDA)

Triethylene diamine of the formula:

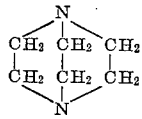

Dimethylethanolamine (DMEA)
Tin esters, such as:
  Stannous oleate
  Stannous octoate
  Dibutyl tin dilaurate and the like.

Many other catalysts may be substituted therefor, if so desired. The amount of catalyst used may be in a range of about 0.5 to about 5 percent or more by weight, based upon the total of the polyols employed. Mixtures of the above catalysts may also be utilized.

To impart a foamed or cellular structure to the blended polyol-polyisocyanate mixture, a suitable cellulating agent or system of cellulating agents must be added. A number of these are available. The liquid but relatively volatile halocarbons, such as the following perhalocarbons containing 1, 2, or even 4 carbon atoms, are especially desirable for the purpose:

$CCl_3F$
$CCl_2F_2$
$C_2Cl_2F_4$
$C_2Cl_3F_3$
$CHCl_2F$
$CClF_3$
$CHClF_2$ and the like.

These are added as liquids in quantities of about 10 percent to about 20 percent by weight of the total resin to the blended polyol-polyisocyanate mixtures or to one or more components thereof, and are substantially volatilized in the liquid mixture to effect cellulation. Subsequently, the mixture cures to a hardened state.

Although the halocarbons are especially desirable as blowing agents when exceptional insulative properties are desired, other blowing agents, such as carbon dioxide and the like can be utilized in this invention. Water causes cellulation to occur through the formation of carbon dioxide from the reaction of water with free isocyanato groups.

In order to obtain relatively uniform distribution of the various components of the liquid system and to obtain proper cellulation, an emulsifier and/or surfactant may be incorporated into the mixture. These materials are physical in their effect and are not always necessary, especially if denser foams are desired. Many hundreds of these are available as commercial products. Some of these are listed in the publication Detergents and Emulsifiers—Up To Date 1960, published by John W. McCutcheon, Inc., 475 Fifth Avenue, New York 17, N.Y.

Examples of surfactants which may be used include the so-called "Pluronics," which have been described as being condensates of ethylene oxide with a hydrophobic base formed by condensing propylene oxide with propylene glycol. These are of a molecular weight in a range of about 2000 to about 8000 and are ascribed the structure:

$$HO(C_2H_4O)_a(C_3H_6O)_b(C_2H_4O)_cH$$

Another class of surfactants comprises the so-called "Tetronics," which are formed by the addition of propylene oxide to ethylene diamine, followed by the addition of ethylene oxide. These compounds have been ascribed the structure:

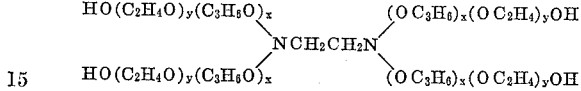

Another valuable class of surfactants comprises the so-called "Tweens," which are described as the monoesters of higher fatty acids, represented by lauric acid, stearic acid and oleic acid, and polyoxyethylene sorbitan.

Another of the more satisfactory surfactants which has been found very effectively to maintain the cell structure in the foaming and curing of polyurethane resins comprises soluble, liquid derivatives of the silicones. One such product is of the approximate structure:

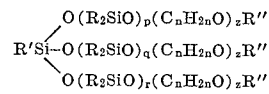

in which R', R, and R" are monovalent hydrocarbon radicals; $p$, $q$, and $r$ are integers equal to at least 1 and may be considerably higher, e.g., 2, 3, 4, 5, 6 or a higher number up to about 20; $n$ is a number about 2, 3, or 4; and $z$ is an integer equal to at least 5 and may be higher, e.g., 6, 7, 8, 9, 10 or even higher, up to about 25. One such material is sold as Dow Corning–199. Still another highly useful silicone base surfactant comprises the so-called "Silicone L–521," which has the formula:

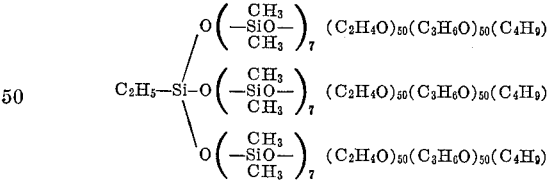

Other surfactants, especially the liquid or soluble nonionic ones, are useful. The surfactants may be employed in amounts within a range of about 0.1 to about 3 percent by weight, based upon the mixture of polyol component and the organic isocyanate component. In relatively dense foams, for example, those weighing about 5 or 6 pounds and upward per cubic foot, the surfactants may be omitted entirely.

The following examples illustrate in detail the novel features of this invention. The examples are not intended to limit the invention, however, for there are, of course, numerous possible variations and modifications. The wood tars utilized in the following examples were resinous liquids or solids containing substantially no volatile materials having a boiling point of less than about 80° C.

EXAMPLE I

Several polyurethane foams were prepared from blends of a hardwood tar (OH number of 214) and various hydroxyl-containing materials by admixing the said blends containing catalyst, cellulating agents and emulsifying agent, with crude tolylene diisocyanate. Foams having the following compositions were prepared:

| Component | Foam IA | Foam IB | Foam IC |
|---|---|---|---|
| Crude tolylene diisocyanate [1] | 103.0 grams | 103.0 grams | 103.0 grams |
| Sucrose polyol [2] (OH–467) | 78.0 grams | 70.0 grams | 32.0 grams |
| Amine polyol [3] (OH–700) | | 10.0 grams | 15.0 grams |
| TMP polyol [4] (OH–340) | 15.0 grams | 15.0 grams | 25.0 grams |
| Hardwood tar | 30.0 grams | 40.0 grams | 60.0 grams |
| Silicone emulsifier (L–521) | 1.0 gram | 1.0 gram | 1.0 gram |
| 1.8 DMEA/0.1 TEDA [5] | 1.3 mls | 1.0 ml | 0.8 ml |
| Trichloromonofluoromethane | 40.0 grams | 42.0 grams | 41.0 grams |
| Mixing time at 85 r.p.m. | 12 seconds | 8 seconds | 7 seconds |
| Cream time [6] | 18 seconds | 12 seconds | 10 seconds |
| Set time [7] | 93 seconds | 74 seconds | 73 seconds |

[1] Crude tolylene diisocyanate comprises approximately equal parts of 2,4-isomer and 2,6-isomer of tolylene diisocyanate and about 15 percent by weight of polymeric isocyanate materials.
[2] Reaction product of 1 mole of sucrose, 0.4 mole of diethylene triamine, 14.5 moles of propylene oxide and 4.0 moles of ethylene oxide.
[3] Reaction product of about 1 mole of diethylenetriamine and 5.0 moles of propylene oxide.
[4] Trimethylolpropane-propylene oxide reaction product.
[5] 1.8 parts by weight of dimethylethanolamine and 0.1 part by weight of triethylenediamine.
[6] The length of time required for a resin to begin cellulation, as measured from initial mixing.
[7] The length of time required for a resin to completely foam, from initial mixing.

Foam A had small cells, good appearance, a density of 1.77 pounds per cubic foot, and a water vapor permeation value of 2.52 perms.

Foam B had small cells, good appearance, a density of 1.75 pounds per cubic foot, and a water vapor permeation value of 2.15 perms.

Foam C had small cells, good appearance, a density of 1.72 pounds per cubic foot, and a water vapor permeation value of 1.37 perms.

EXAMPLE II

A hardwood tar having a hydroxyl number of 214 was propoxylated in the following manner:

| | Grams |
|---|---|
| Hardwood tar (30° C. flow point) | 1500 |
| Propylene oxide | 500 |
| Potassium hydroxide | 17.7 |

The hardwood tar was charged into a reactor vessel having a recirculating line through an external heat exchanger. The temperature of the hardwood tar was raised to about 220° F. Propylene oxide was added incrementally while the reaction mixture was being circulated through the heat exchanger to remove the heat of reaction and to control the temperature at about 210° F. The reaction was continued for about 8 hours with the propylene oxide addition being regulated in such a manner that the reaction vessel pressure did not exceed 50 p.s.i.g.

The pressure on the reaction vessel was slowly released and the crude reaction product was recovered. The crude reaction product was then vacuum distilled in the presence of 18.0 grams of 85 percent phosphoric acid in an apparatus having a condenser and water trap. The distillation was conducted at about 170° C. and about 15 millimeters for a period of about 4 hours. The distilled product was then filtered. The filtered product had a hydroxyl number of 231.

EXAMPLE III

A polyurethane foam was prepared from the oxalkylation product of a hardwood tar (OH number of 214) of the type prepared in Example II, containing catalyst, cellulating agent and emulsifier by reaction with a polyisocyanate in the following manner.

| Component | Foam III-A | Foam III-B |
|---|---|---|
| p,p'-diphenylmethane diisocyanate | 103.0 grams | |
| Polymethylene polyphenyl isocyanate | | 103.0 grams |
| Hardwood tar-propylene oxide adduct (OH–223) | 189.0 grams | 189.0 grams |
| N,N,N',N'-tetramethyl-1,3-butanediamine | 2.0 mls | 3.0 mls |
| Silicone emulsifier (L–521) | 1.0 gram | 1.0 gram |
| Trichloromonofluoromethane | 47.5 grams | 47.5 grams |
| Mixing time at 85 r.p.m. | 20 seconds | 20 seconds |
| Cream time [1] | 35–40 seconds | 35–40 seconds |
| Set time [1] | 190–200 seconds | 200–220 seconds |

[1] Cream time and set time are defined in Example I above.

Foams were produced from both compositions, although they were relatively weak and friable in comparison with the foams produced in Example I.

EXAMPLE IV

A polyurethane foam was prepared from a blend of an oxyalkylation product of a hardwood tar (OH number of 214) of the type prepared in Example II and a glycerol-propylene oxide adduct having a hydroxyl number of about 660 and an organic polyisocyanate in the following manner:

| Component | Quantity |
|---|---|
| Polymethylene polyphenyl isocyanate grams | 105.0 |
| Hardwood tar-propylene oxide adduct (OH–231) grams | 80.0 |
| Glycerol-propylene oxide adduct (OH–660) grams | 36.0 |
| Silicone emulsifier—L–521 grams | 1.0 |
| Dibutyl tin dilaurate (catalyst) milliliter | 0.3 |
| N,N,N',N'-dimethyl-2,3-butane-diamine (catalyst) milliliter | 1.8 |
| Trichloromonofluoromethane grams | 39.0 |
| Mixing time at 85 r.p.m. seconds | 13 |
| Cream time [1] do | 23 |
| Set time [1] do | 53 |

[1] Cream time and set time are defined in Example I.

The emulsifier, catalysts and cellulating agent were mixed with the polyol blend prior to reaction with the isocyanate.

The resulting foam had an excellent appearance, was relatively tough, and had a fine cell structure.

EXAMPLE V

Polyurethane foams were prepared from the following compositions:

| Component | Foam V-A | Foam V-B |
|---|---|---|
| Crude tolylene diisocyanate [1] | 103.0 grams | 103.0 grams |
| Sucrose-DETA polyol [2] | 119.0 grams | 97.0 grams |
| Hardwood tar (OH–241) | 40.0 grams | 60.0 grams |
| Silicone emulsifier (L–521) | 1.0 gram | 1.0 gram |
| Dibutyl tin dilaurate (catalyst) | 0.2 milliter | 0.2 milliliter |
| 1.0 DMEA/0.4 TEDA [1] | 1.5 milliliters | 1.5 milliliters |
| Trichloromonofluoromethane | 46.5 grams | 46.0 grams |
| Mixing time at 85 r.p.m. | 10 seconds | 10 seconds |
| Cream time [1] | 12–13 seconds | 12–13 seconds |
| Set time [1] | 75–85 seconds | 75–85 seconds |

[1] Crude tolylene diisocyanate, cream time, set time, and DMEA/TEDA are defined in Example I.
[2] Sucrose-DETA polyol is the oxyalkylation product of: 1 mole of sucrose, 0.4 mole of diethylenetriamine, 20 moles of propylene oxide, and 4 moles of ethylene oxide.

The catalysts, emulsifier and cellulating agent were admixed with the polyol-hardwood tar blend prior to the reaction with the isocyanate.

Foam V-A, after it was cured at room temperature for 24 hours, was strong and non-friable with a density of 1.83 pounds per cubic foot and a water vapor permeation value of 2.74 perms per inch.

Foam V-B, after it was cured at room temperature for 24 hours, was strong and slightly friable, with a density of 1.87 pounds per cubic foot and a water vapor permeation value of 2.42 perms per inch.

EXAMPLE VI

A polyurethane foam was prepared from the co-oxyalkylation product of a hardwood tar (OH number of 214) and a sucrose polyether by reacting with an organic polyisocyanate in the following manner:

| Component: | Quantity |
|---|---|
| p,p'-diphenylmethane diisocyanate __grams__ | 103.0 |
| Hardwood tar-sucrose co-oxyalkylation product [1] (OH-402) _____grams__ | 105.0 |
| Silicone emulsifier (L-521) _____gram__ | 1.0 |
| Dibutyl tin dilaurate (catalyst) __milliliter__ | 0.3 |
| N,N,N',N' - dimethyl - 2,3 - butanediamine (catalyst) _____milliliters__ | 2.0 |
| Trichloromonofluoromethane _____grams__ | 37.0 |
| Mixing time at 85 r.p.m. _____seconds__ | 16–17 |
| Cream time [2] _____do____ | 19–20 |
| Set time [2] _____do____ | 43–45 |

[1] The co-oxyalkylation product was prepared by reacting 650 grams of a sucrose polyether (1 mole of sucrose, 6 moles of propylene oxide) and 500 grams of a hardwood tar (OH-214) with 460 grams of propylene oxide.
[2] Cream time and set time are defined in Example I.

EXAMPLE VII

Four polyurethane foams were prepared to illustrate the benefical effect of hardwood tar upon the ultimate water vapor resistance of a polyurethane foam. The foams were prepared by admixing the catalysts, emulsifier and cellulating agent with the polyol-hardwood tar blend prior to reaction with an organic polyisocyanate. The foams had the following compositions:

| Component | Foam VII-A | Foam VII-B | Foam VII-C | Foam VII-D |
|---|---|---|---|---|
| Crude tolylene diisocyanate [1] | 103.0 grams | 103.0 grams | 103.0 grams | 103.0 grams. |
| Sucrose-DETA Polyol [2] (OH-467) | 105.0 grams | 100.0 grams | 86.0 grams | 62.0 grams. |
| DETA-Polyol (OH-700) [3] | | | 10.0 grams | 20.0 grams. |
| Hard wood tar (OH-214) | | 20.0 grams | 20.0 grams | 40.0 grams. |
| Silicone emulsifier (L-521) | 10.0 grams | 1.0 gram | 1.0 gram | 1.0 gram. |
| 1.8 DMEA/0.1 TEDA [1] (catalyst) | 1.5 milliliters | 1.5 milliliters | 1.2 milliliters | 0.8 milliliters. |
| Trichloromonofluoromethane | 39.0 grams | 39.5 grams | 39.0 grams | 40.0 grams. |
| Mixing time at 85 r.p.m. | 12 seconds | 11 seconds | 9 seconds | 7 seconds. |
| Cream time [1] | 15 seconds | 14 seconds | 13 seconds | 10 seconds. |
| Set time [1] | 70 seconds | 79 seconds | 57 seconds | 36 seconds. |
| Percent hardwood tar based on total foam formulation. | 3.86 percent | 7.55 percent | 7.7 percent | 15.0 percent. |
| Density (lb./cu. ft.) | 1.71 | 1.67 | 1.76 | 1.68. |
| Water vapor permeation (perms per inch). | 3.47 | 3.02 | 2.43 | 1.55. |

[1] Crude tolylene diisocyanate, DMEA/TEDA, cream time and set time are defined in Example I.
[2] Oxyalkylation product of 1 mole of sucrose, 0.4 mole of diethylenetriamine 14.5 moles of propylene oxide and 4.0 moles of ethylene oxide.
[3] Oxyalkylation product of 1 mole of diethylenetriamine and 5 moles of propylene oxide.

EXAMPLE VIII

A polyurethane foam having fine, uniform cell structure was prepared from a hardwood tar (OH number of 211) in the following manner:

| Component: | | Quantity |
|---|---|---|
| Polymethylene polyphenyl isocyanate | grams__ | 50 |
| Hardwood tar (OH-211) | _do____ | 100 |
| Silicone emulsifier (L-521) | _do____ | 0.5 |
| 1.0 DMEA/0.4 TEDA [1] | milliliter__ | 0.8 |
| Trichlorotrifluoroethane | grams__ | 26.4 |
| Mixing time at 85 r.p.m. | seconds__ | 30 |
| Cream time [1] | do____ | 40–45 |
| Set time [1] | do____ | 75–80 |

[1] DMEA/TEDA, cream time and set time are defined in Example I.

EXAMPLE IX

Two polyurethane foams having fine, uniform cell structure and low water vapor transmission values were prepared from a hardwood tar (OH number of 214)—propylene oxide adduct in the following manner:

| Component | Foam IX-A | Foam IX-B |
|---|---|---|
| Polymethylene polyphenyl isocyanate | 103.0 grams | |
| Crude tolylene diisocyanate [1] | | 103.0 grams. |
| Hardwood tar-propylene oxide adduct (OH-223) | 90.0 grams | 84.0 grams. |
| Trimethylolpropane-propylene oxide reaction product (OH-340) | 40.0 grams | 60.0 grams. |
| 1.0 parts by weight dimethylethanolamine/0.4 part by weight triethylenediamine | | 2.0 milliliter. |
| Dibutyl tin dilaurate | 0.3 milliliter | 0.3 milliliter. |
| N,N,N',N'-tetramethyl-1,3-butanediamine | 2.0 milliliters | |
| Silicone emulsifier (L-521) | 1.0 grams | 1.0 grams. |
| Trichloromonofluoromethane | 38.0 grams | 40.5 grams. |
| Mixing time at 85 r.p.m. | 20 seconds | 17 seconds. |
| Cream time [2] | 30 seconds | 24 seconds. |
| Set time [2] | 65 seconds | 90–95 seconds. |

[1] Crude tolylene diisocyanate comprises approximately equal part of 2,4-isomer and 2,6-isomer of tolylene diisocyanate and about 15 percent by weight of polymeric isocyanate materials.
[2] Cream time and set time are defined in Example I.

The catalysts, cellulating agent and emulsifier were admixed with the co-oxyalkylation product prior to reaction with the organic polyisocyanate.

The foam, after curing at room temperature for 24 hours, was strong and non-friable, and had a fine cell structure, a density of 1.94 pounds per cubic foot and a water vapor permeation value of 1.78 perms per inch.

Foam IX-A had a density of 2.29 pounds per cubic foot and water vapor permeation value of 1.46 perms per inch.

Foam IX-B had a density of 2.03 pounds per cubic foot and water vapor permeation value of 1.5 perms per inch.

EXAMPLE X

A polyurethane foam having good cell structure and low water vapor transmission was prepared from a hardwood tar (OH number of 214)-propylene oxide adduct by reacting, said adduct containing another polyol, catalyst, emulsifier and cellulating agent, with an organic polyisocyanate in the following proportions:

| Component: | | Quantity |
|---|---|---|
| Polymethylene polyphenyl isocyanate | grams | 105.0 |
| Hardwood tar-propylene oxide adduct (OH–231) | do | 80.0 |
| Glycerol propylene oxide adduct (OH—66D) | grams | 36.0 |
| Silicone emulsifier | do | 1.0 |
| Dibutyl tin dilaurate | milliliter | 0.3 |
| N,N,N',N' - tetramethyl - 1,3-butane diamine | milliliter | 1.8 |
| Trichloromonofluoromethane | grams | 39.0 |
| Mixing time at 85 r.p.m. | seconds | 13 |
| Cream time [1] | do | 23 |
| Set time [1] | do | 53 |

[1] Cream time and set time are defined in Example I.

The resulting foam had a good appearance, small cells, a density of 1.86 pounds per cubic foot, and a water vapor permeation value of 1.14 perms per inch.

While specific examples of the invention have been set forth hereinabove, it is not intended to limit the invention solely thereto, but to include all of the variations and modifications thereof which are within the scope of the appended claims.

What is claimed is:

1. The oxyalkylation product of an alkylene oxide having 2 to 4 carbon atoms and a wood tar derived by the thermal decomposition of wood, said wood tar having a hydroxyl value between about 40 and about 300 and said oxyalkylation product prepared by reacting said alkylene oxide and said wood tar at a temperature between about 50° C. and about 170° C. in the presence of a basic catalyst.

2. The oxyalkylation product of claim 1 wherein the wood tar is a hardwood tar.

3. The oxyalkylation product of claim 1 wherein the wood tar is a pine tar.

4. The oxyalkylation product of claim 1 wherein the alkylene oxide is ethylene oxide.

5. The oxyalkylation product of claim 1 wherein the alkylene oxide is propylene oxide.

6. The oxyalkylation product of claim 1 wherein said oxyalkylation product has a hydroxyl number of at least about 50.

7. The oxyalkylation product of claim 1 wherein said oxyalkylation product has a hydroxyl number of between about 150 and about 290.

References Cited

UNITED STATES PATENTS 3,092,594  6/1963  Heiss _____ 260—2.5

OTHER REFERENCES

Abraham, Asphalts and Allied Substances, vol. II, Sixth Edition (pp. 20–23, 95 and 96 relied on).

DONALD E. CZAJA, Primary Examiner

W. E. PARKER, Assistant Examiner

U.S. Cl. X.R.

260—2.5, 106